(12) United States Patent
Forny et al.

(10) Patent No.: US 9,968,112 B2
(45) Date of Patent: May 15, 2018

(54) INSTANT BEVERAGE TABLET FOR PRODUCING A LAYERED BEVERAGE

(71) Applicant: NESTEC S.A., Vevey (CH)

(72) Inventors: Laurent Forny, Singapore (SG);
Lennart Fries, Lausanne (CH);
Vincent Meunier, Epalinges (CH);
Gerhard Niederreiter, Savigny (CH);
Stefan Palzer, Lausanne (CH);
Christoph Reh, Epalinges (CH)

(73) Assignee: Nestec S.A., Vevey (CH)

( * ) Notice: Subject to any disclaimer, the term of this patent is extended or adjusted under 35 U.S.C. 154(b) by 0 days. days.

(21) Appl. No.: 15/502,042

(22) PCT Filed: Aug. 4, 2015

(86) PCT No.: PCT/EP2015/067913
§ 371 (c)(1),
(2) Date: Feb. 6, 2017

(87) PCT Pub. No.: WO2016/020367
PCT Pub. Date: Feb. 11, 2016

(65) Prior Publication Data
US 2017/0223979 A1    Aug. 10, 2017

(30) Foreign Application Priority Data

Aug. 7, 2014    (EP) .................................... 14180250

(51) Int. Cl.
| A23F 5/38 | (2006.01) |
| A23L 2/395 | (2006.01) |
| A23G 1/56 | (2006.01) |
| A23C 9/18 | (2006.01) |
| A23L 2/39 | (2006.01) |
| A23C 11/00 | (2006.01) |

(52) U.S. Cl.
CPC ................ *A23F 5/385* (2013.01); *A23C 9/18* (2013.01); *A23C 11/00* (2013.01); *A23G 1/56* (2013.01); *A23L 2/39* (2013.01); *A23L 2/395* (2013.01)

(58) Field of Classification Search
CPC ... A23F 5/38; A23L 2/395; A23G 1/56; A23C 9/18
See application file for complete search history.

(56) References Cited

U.S. PATENT DOCUMENTS

2009/0162489 A1    6/2009 Singh

FOREIGN PATENT DOCUMENTS

| EP | 0916266 | 5/1999 |
| EP | 2721931 | 4/2014 |
| WO | 2004071899 | 8/2004 |
| WO | 2013001052 | 1/2013 |

*Primary Examiner* — Hoa V Le
(74) *Attorney, Agent, or Firm* — K&L Gates LLP

(57) ABSTRACT

An instant beverage tablet in the form of multilayer tablet for producing a layered beverage having one or more cream layer(s), coffee and/or cocoa layer(s) and optionally a foam upon reconstitution in a liquid comprising a dark component having sugar, coffee and/or cocoa particles for producing a dark layer; a white component having creamer and sugar for producing white layer; wherein the dark component has a density in the range of 0.5 to 0.7 $g/cm^3$ and wherein the white component has a density in the range of 0.74 to 0.9 $g/cm^3$ and wherein the dark component is compressed with a compaction pressure of at least 250 kPa and wherein the white component is compressed with a compaction pressure of at least 1250 kPa.

13 Claims, 4 Drawing Sheets

INSTANT BEVERAGE TABLET FOR PRODUCING A LAYERED BEVERAGE

CROSS REFERENCE TO RELATED APPLICATIONS

The present application is a National Stage of International Application No. PCT/EP2015/067913, filed on Aug. 4, 2015, which claims priority to European Patent Application No. 14180250.4, filed Aug. 7, 2014, the entire contents of which are being incorporated herein by reference.

FIELD OF THE INVENTION

The present invention relates to an instant beverage tablet in the form of a multilayer tablet for producing a layered beverage having one or more cream layer(s), coffee and/or cocoa layer(s) and optionally foam upon reconstitution in a liquid.

BACKGROUND

Current retail coffee mixes solutions cannot deliver an instant layered beverage, although consumers are used to a layered appearance (for instance Latte Macchiato).

Preparation of a Latte Macchiato involves various steps including frothing milk, generally producing generous foam, pouring it into a glass, and adding espresso. The frothing is generally extensive, yielding significant light, "dry" foam, with a layer of liquid milk underneath, rather than the "wet" microfoam used in latte art.

Alternatively, it may be prepared as a layered drink, with the espresso gently poured (most gently out of a small espresso brew pitcher, over the back of a spoon so that it forms a layer between the denser liquid milk below and the lighter foam above. In this case a glass is essential for the layers to be visible.

EP0916266 relates to the use of the use of frozen concentrated and aerated milk for preparing a hot beverage having foamed milk-based topping on the addition of a fluid product.

US20090162489 relates to effervescent tablet for use as an additive in hot coffee or hot water includes one or more creamer additives, pH stabilizing agents, effervescence agents and solubility agents.

It is known in the art to use compositions that deliver a foam layer, but such compositions do not form a layered beverage. There exists coffee systems such as Dolce Gusto® machines which deliver a layered beverage, such a machine delivers in a two-step approach wherein the machine is loaded with a cream capsule as first step which delivers a cream layer and then machine is loaded with a coffee capsule as a second step which delivers a coffee layer. The problem is that consumer requires a machine to obtain such a beverage and such systems may not be affordable for all consumers.

Thus there is a need for an instant composition that can deliver a layered beverage by reconstituting in a suitable liquid. The present invention offers a new solution to retail coffee mixes so that consumers can enjoy a layered beverage, for instance, a coffee house experience at a home environment.

SUMMARY OF THE INVENTION

One aspect of the present invention relates to an instant beverage tablet in the form of a multilayer tablet for producing a layered beverage having one or more cream layer(s), coffee and/or cocoa layer(s) and optionally foam upon reconstitution in a liquid comprising:
 (a) a dark component having sugar, coffee and/or cocoa particles for producing a dark layer;
 (b) a white component having creamer and sugar for producing white layer;
 wherein the dark component is compressed with a compaction pressure of at least 250 kPa and wherein the white component is compressed with a compaction pressure of at least 1250 kPa; and
 wherein the dark component has a density in the range of 0.5 to 0.7 g/cm$^3$ and wherein the white component has a density in the range of 0.74 to 0.9 g/cm$^3$.

Another aspect of the present invention relates a process of producing a beverage tablet for making layered coffee beverage comprising compacting, under a force and pressure.

DETAILED DESCRIPTION OF THE INVENTION

Figure 1A:
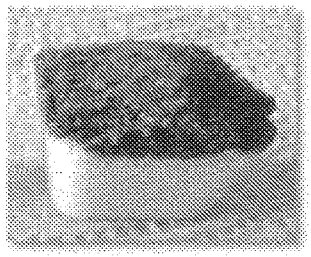
FIGS. 1A-1D are examples of a few embodiments of the invention. The figures illustrate a few tablet designs comprising a dark component and a white component.
Figure 1B:
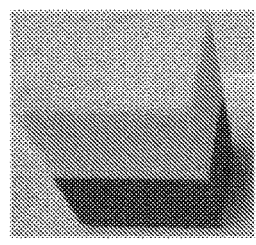
Figure 1C:
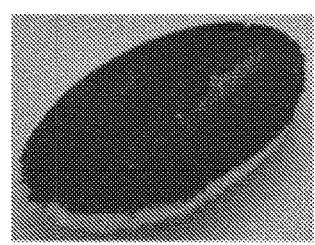
Figure 1D:
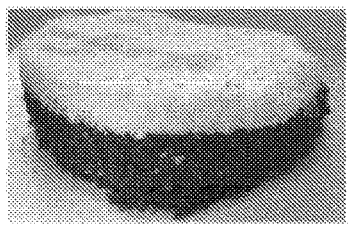

In one embodiment of the present invention, the tablet is in the form of a multilayer tablet having a compressed coffee layer portion and wherein the total moisture content of the dark component is below 6%, for instance between 1 to 4% by weight.

In another embodiment of the present invention, the tablet is in the form of a multilayer tablet having a compressed creamer layer portion wherein the total moisture content of the white component is below 5%, for instance between 2.5 to 4% by weight.

In one embodiment of the present invention, the dissolution time of the dark component is below 10 seconds, for instance between 3 to 9 seconds or 3 to 6 seconds and the dissolution time of the white component is below 30 seconds, for instance between 13 to 20 seconds.

The term "instant beverage" refers to a mix when reconstituted in liquid produces instantly a layered coffee beverage having one or more cream layer(s), coffee layer(s) and optionally a foam upon stirring.

The liquid could be cold (for instance between 5-15° C.) or hot (for instance between 80-85° C.). Stirring may be done by hand using a teaspoon.

The term "dark component" refers to a composition comprising cocoa and/or coffee particles, preferably soluble coffee, micronized coffee or cocoa powders (soluble and/or micronized forms) and sugar.

The term "white component" refers to a composition comprising creamers and sugar. The creamer can be dairy creamer, non-dairy creamer, field-dairy creamer, fresh milk, milk powder, whole milk and/or skimmed milk.

The term "sugar" in this context of referring to dark and white components refers to low-calorie sweeteners, maltose, maltodextrin, sucrose, lactose, fructose, glucose and/or galactose.

In one embodiment of the present invention, the ratio of sugar:coffee for the dark component ranges between 1:1 to 3:1.

In another embodiment of the present invention, the ratio of sugar:creamer for the white component ranges between 1:1 to 1:3.

The term "density" refers to the mass of a given tablet divided by its volume. The volume of the tablet is defined by the outer dimensions, i.e a cube of 20×20×30 mm. This density definition, which includes pores within the tablet structure, is also referred to as envelope density.

The term "multi-layer tablet" refers to layers of arranging dark and white layers for e.g. like a sandwich. The layers can also be in the form a core-shell structure, colored patches, colored geometrical shapes (for instance cuboid, cylindrical, egg-shaped and/or ellipsoid), colored objects (for instance coffee beans, coffee cup). Few examples are shown in FIGS. 1A-1D.

The term "compressed" refers to applying a compression force on the dark or the white component for increasing the density and in order to build a stable structure of adhering particles e.g. using roller compactor or tablet press.

The term "dissolution" refers to the reconstitution of the soluble tablet in a liquid. The term t90 refers to the time taken for 90% weight of the tablet to be dissolved in a liquid. This time t90 can measured accurately by means of electrical conductivity, i.e using the device Metrohm module 856. A water bath is kept at constant temperature. The conductivity probe is introduced into the liquid and kept, until a steady state electrical conductivity is measured. Adding a tablet into the liquid starts the measurement. Stirring can be applied with the help of a magnetic stirrer. Ions released upon dissolution of the tablet increase the electrical conductivity of the medium. By dissolving the tablet completely, a plateau of the electrical conductivity is reached. The time t90 is defined as the point of time, when 90% of the total conductivity transition from the initial to the final steady state value is reached. For more details consult the Metrohm user manual: http://partners.metrohm.com/GetDocument?action=get_dms_document&docid=1432097

Figure 2A:
FIGS. 2A-2C show examples of a layered beverage.
Figure 2B:
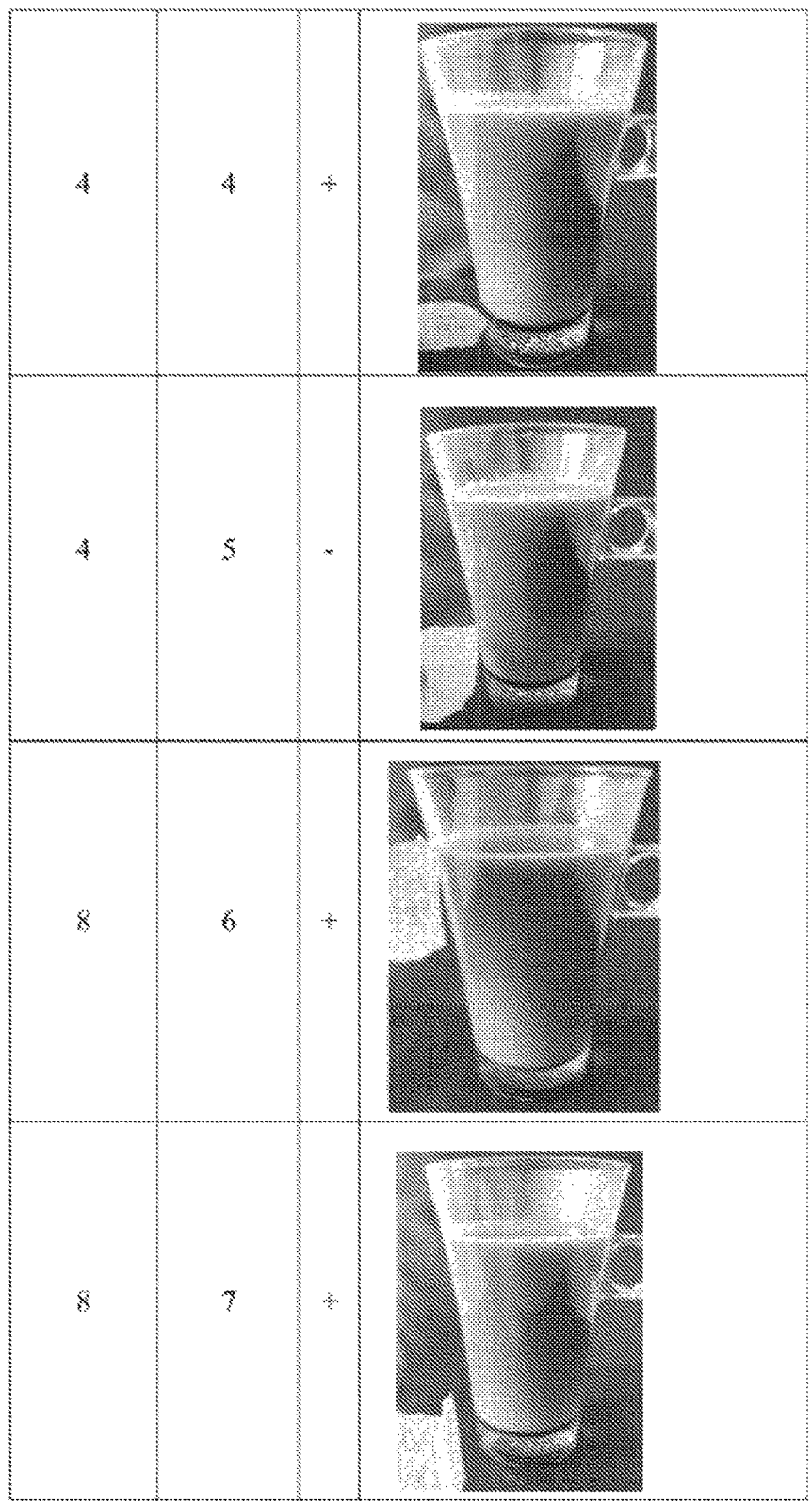
Figure 2C:
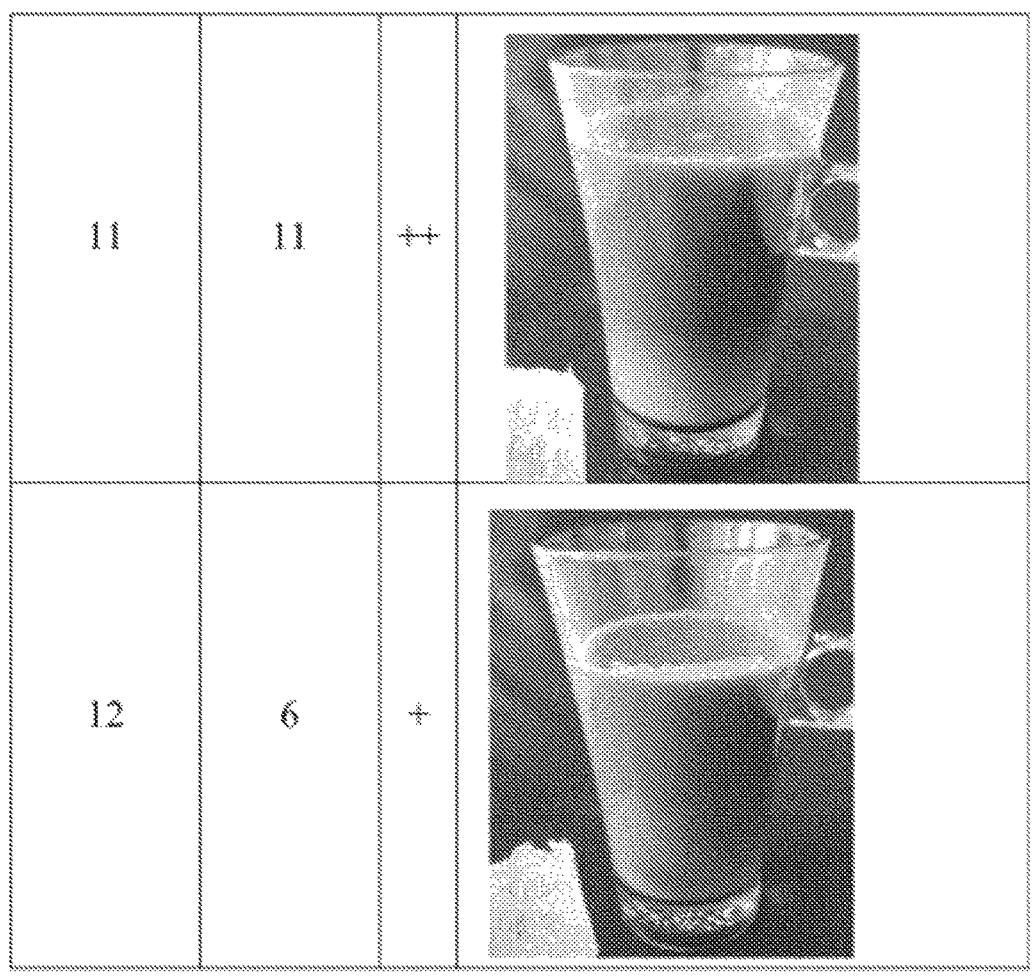

In one embodiment of the present invention, the tablet comprises a dark and a white component wherein the ratio of sugar:coffee for the dark component is about 2.5:1 and the ratio of sugar:creamer for the white component is about 5:6. The density of the dark component is between 0.5-0.7 g/cm$^3$ and the density of the white component is between 0.74-0.9 g/cm$^3$. FIGS. 2A-2C show a perfect layered beverage obtained using trial no. 3 or 4 of creamer component (see table 2) and trail no. 3 of coffee component (see table 1). The ranges disclosed for dark and white components also include each of the values depicted in the tables 1 and 2 in combination in separate embodiment wherein each combination as shown leads to a layered beverage.

In another embodiment of the present invention, the tablet comprises a dark and a white component wherein the ratio of sugar:coffee for the dark component is about 2.5:1 and the ratio of sugar:creamer for the white component is about 1:1. FIGS. 2A-2C show a perfect layered beverage obtained using trial no. 11 of creamer component (see table 2) and trail no. 11 of coffee component (see table 1).

EXAMPLES

Ingredients of the white component are mixed in a lab beaker, adding first sugar than water then creamer. The composition is filled in a mold or dosed into the feeder of a tableting machine. The powder is compressed by a piston, just as much to form a stable tablet. In parallel, the ingredients of the black composition are mixed. The preparation is filled on top of the white tablet layer and compressed onto it in a second tableting step. Optionally the produced tablet is sprayed by water to smoothen the tablet or sintered in an oven or dried to achieve the final surface texture, stability and moisture content.

Two compositions were prepared to make an instant multilayer beverage tablet. The first composition is dark layer component having sugar and coffee. Below table 1 shows different compositions having different ratios of sugar and coffee. These compositions were compacted at defined force and pressure as depicted in the table below. Layer formation was tested on the multilayer composition comprising the dark and white layers.

TABLE

| 1 Dark layer component | | | | | | | |
|---|---|---|---|---|---|---|---|
| Trial no. | sugar/ coffee ratio grams | Moisture content % | Compaction pressure kPa | coffee layer g/cm3 | t90 s | Dissolution | layers formed yes/no | comment |
| 1 | 4:1 | 4 | 340 | 0.675 | 13 | instant | no | |
| 2 | 3:1 | 4 | 284 | 0.567 | 5.1 | instant | no | |
| 3 | 2.5:1 | 4 | 284 | 0.523 | 3.5 | instant | yes | |
| 4 | 2:1 | 4 | 511 | 0.532 | 4.2 | floating | yes | |
| 5 | 1:1 | 4 | 567 | 0.436 | 28.7 | floating | no | |
| 6 | 2.5:1 | 3 | 326 | 0.523 | 4.9 | floating | yes | |
| 7 | 2.5:1 | 3.5 | 270 | 0.523 | 6.2 | floating | yes | |
| 8 | 2.5:1 | 5 | 113 | 0.523 | 3.2 | instant | no | |
| 9 | 2.5:1 | 4 | 582 | 0.621 | 7.9 | floating | yes | |
| 10 | 2.5:1 | 4 | 496 | 0.584 | 5.5 | instant | yes | |
| 11 | 2.5:1 | 4 | 369 | 0.552 | 3.8 | instant | yes | |
| 12 | 2.5:1 | 2.5-1 | 199 | 0.496 | 2.9 | instant | no | fragile |
| 13 | 2.5:1 | 4 | 156 | 0.473 | 3.1 | instant | no | fragile |
| 14 | 2.5:1 | 2.5-1 | 128 | 0.451 | 3.1 | instant | no | fragile |

The conclusion from above test was that the tablet density for the dark layer must be >0.5 g/cm3 and must be <0.7 g/cm3. The tablet must float in water (85° C.) and the dissolution time for 90% of the tablet (T90) to be dissolved must be <6 s.

The second composition of the multilayer beverage tablet is white layer component having sugar and creamer. Below table 2 shows different compositions having different ratios of sugar and creamer. These compositions were compacted at defined force and pressure as depicted in the table below. Layer formation was tested on the multilayer composition comprising the dark and white layers.

TABLE

| | | | 2 Cream layer components | | | | | |
|---|---|---|---|---|---|---|---|---|
| Trial no. | sugar/ creamer ratio grams | Moisture content % | Compaction pressure kPa | creamer layer g/cm3 | t90 s | Dissolution | layers formed yes/no | comment |
| 1 | 1:3 | 3 | 1345 | 0.648 | 14.1 | floating | no | |
| 2 | 2:3 | 3 | 1495 | 0.709 | 17 | floating | no | |
| 3 | 5:6 | 3 | 1495 | 0.743 | 15.7 | sinking | yes | |
| 4 | 1:1 | 3 | 1420 | 0.757 | 17.1 | sinking | yes | |
| 5 | 4:3 | 3 | 1196 | 0.779 | 15.4 | sinking | no | |
| 6 | 5:6 | 3 | 2093 | 0.743 | 14.2 | sinking | yes | |
| 7 | 5:6 | 4 | 1271 | 0.743 | 15.1 | sinking | yes | |
| 8 | 5:6 | 4 | 972 | 0.743 | 18.2 | floating | no | |
| 9 | 5:6 | 3 | 5979 | 0.867 | 28.7 | sinking | yes | |
| 10 | 5:6 | 3 | 4036 | 0.821 | 21.4 | sinking | yes | |
| 11 | 5:6 | 3 | 3064 | 0.780 | 17.9 | sinking | yes | |
| 12 | 5:6 | 3 | 1495 | 0.709 | 15.1 | floating | no | |
| 13 | 5:6 | 3 | 972 | 0.678 | 11.7 | floating | no | fragile |
| 14 | 5:6 | 3 | 598 | 0.650 | 10 | floating | no | fragile |

The conclusion from above test was that the tablet density for the dark layer must be >0.74 g/cm3 and must be <0.82 g/cm3. The tablet must sink in water (85° C.) and the dissolution time for 90% of the tablet (T90) to be dissolved must be <20 s. The moisture content must be <4%.

The invention claimed is:

1. An instant beverage tablet in the form of a multilayer tablet for producing a layered beverage having at least one layer selected from the group consisting of a cream layer, coffee layer and cocoa layer comprising:
   a dark component having sugar, coffee and/or cocoa particles for producing a dark layer;
   a white component having creamer and sugar for producing white layer;
   wherein the dark component is compressed with a compaction pressure of at least 250 kPa and wherein the white component is compressed with a compaction pressure of at least 1250 kPa; and
   wherein the dark component has a density in the range of 0.5 to 0.7 g/cm³ and wherein the white component has a density in the range of 0.74 to 0.9 g/cm³.

2. The tablet of claim 1, wherein the tablet has a compressed dark layer portion and wherein the total moisture content of the dark component is below 6%.

3. The tablet of claim 2, wherein the total moisture content of the dark component ranges between 1 to 4% by weight.

4. The tablet of claim 1 wherein the tablet is in the form of a multilayer tablet having a compressed white layer portion wherein the total moisture content of the white component is below 5%.

5. The tablet of claim 4, wherein the total moisture content of the white component ranges between 2.5 to 4% by weight.

6. The tablet of claim 1 wherein the dissolution time (t90) of the dark component is less than 10 seconds.

7. The tablet of claim 6 wherein the dissolution time (t90) of the dark component is between 3 to 6 seconds.

8. The tablet of claim 1 wherein the dissolution time (t90) of the white component is less than 30 seconds.

9. The tablet of claim 8 wherein the dissolution time (t90) of the white component is between 13 to 20 seconds.

10. The tablet of claim 1 wherein the ratio of sugar:coffee for the dark component ranges between 1:1 to 3:1.

11. The tablet of claim 1 wherein the ratio of sugar:creamer for the white component ranges between 1:1 to 1:3.

12. The tablet of claim 1 wherein the creamer is selected from the group consisting of dairy creamer, non-dairy creamer, field-dairy creamer, fresh milk, milk powder, whole milk and skimmed milk.

13. The tablet of claim 1 wherein the sugar is selected from the group consisting of low-caloric sweeteners, maltose, maltodextrin, sucrose, lactose, fructose, glucose and galactose.

* * * * *